(12) United States Patent
Gao et al.

(10) Patent No.: US 7,493,251 B2
(45) Date of Patent: Feb. 17, 2009

(54) USING SOURCE-CHANNEL MODELS FOR WORD SEGMENTATION

(75) Inventors: Jianfeng Gao, Beijing (CN); Mu Li, Beijing (CN); Chang-Ning Huang, Beijing (CN); Jian Sun, Beijing (CN); Lei Zhang, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1320 days.

(21) Appl. No.: 10/448,644

(22) Filed: May 30, 2003

(65) Prior Publication Data

US 2004/0243408 A1 Dec. 2, 2004

(51) Int. Cl.
*G06F 17/27* (2006.01)
*G10L 11/00* (2006.01)
(52) U.S. Cl. .................... 704/8; 704/257; 704/9
(58) Field of Classification Search ............... None
See application file for complete search history.

(56) References Cited

U.S. PATENT DOCUMENTS

| | | | | |
|---|---|---|---|---|
| 5,576,954 | A * | 11/1996 | Driscoll | 704/9 |
| 6,052,657 | A * | 4/2000 | Yamron et al. | 704/9 |
| 6,311,152 | B1 * | 10/2001 | Bai et al. | 704/9 |
| 6,374,210 | B1 * | 4/2002 | Chu | 704/9 |
| 7,124,080 | B2 * | 10/2006 | Chen et al. | 704/244 |

OTHER PUBLICATIONS

Cheng, Kowk-Shing, Gilbert H. Yong and Kam-Fai Wong, 1999, "A study on word-based and integral-bit Chinese text compression algorithms," JASIS, 50(3) :218-228.
Chien, Lee-Feng, 1997 PAT-tree-based keyword extraction for Chinese information retrieval, In SIGIR97, 27-31.
Dai, Yubin, Christopher S. G. Khoo and Tech Ee Loh, 1999, "A new statistical formula for Chinese word segmentation incorporating contextual information," SIGIR99, 82-89.
Gao, Jianfeng, Joshua Goodman, Mingjing Li and Kai-Fu Lee, 2002, "Toward a Unified Approach to Statistical Language Modeling for Chinese," *ACM TALIP*, 1(1) :3-33.
Lin, Ming-Yu, Tung-Hui Chiang and Keh-Yi Su, 1993, "A preliminary study on unknown word problem in Chinese word segmentation," ROCLING 6, 119-141.
Sproat, Richard and Chilin Shih, 2002, "Corpus-Based Methods in Chinese Morphology and Phonology," In: *COOLING 2002*.
Sproat, Richard, Chilin Shih, William Gale and Nancy Chang, 1996, "A Stochastic Finite-State Word-Segmentation Algorithm for Chinese," *Computational Linguistics*, 22(3) : 377-404.

(Continued)

*Primary Examiner*—David D Knepper
(74) *Attorney, Agent, or Firm*—Thomas M. Magee; Westman, Champlin & Kelly, P. A.

(57) ABSTRACT

A method and apparatus for segmenting text is provided that identifies a sequence of entity types from a sequence of characters and thereby identifies a segmentation for the sequence of characters. Under the invention, the sequence of entity types is identified using probabilistic models that describe the likelihood of a sequence of entities and the likelihood of sequences of characters given particular entities. Under one aspect of the invention, organization name entities are identified from a first sequence of identified entities to form a final sequence of identified entities.

51 Claims, 4 Drawing Sheets

OTHER PUBLICATIONS

Sun, Jian, Jianfeng Gao, Lei Zhang, Ming Zhou and Chang-Ning Huang, 2002, "Chinese Named Entity Identification Using Class-Based Language Model," In: *COLING 2002*.

Teahan, W.J., Yingying Wen, Rodger McNad and Ian Witten, 2002, "A Compression-Based Algorithm for Chinese Word Segmentation," *Computational Linguistics*, 26(3) : 375-393.

Wu, Zimin and Gwyneth Tseng, 1993, Chinese text segmentation for text retrieval achievements and problems, JASIS, 44 (9) : 532-542.

Katz, S.M., 1987, Estimation of probabilities from sparse data for language model component of a speech recognizer, IEEE ASSP 35 (3) : 400-401.

Table of Contents of the Coling 2002 Conference Aug. 24-Sep. 1, 2002, http://portal.acm.org, 18 pages, 2008.

Coling 2002 Conference, http://www.coling2002.sinica.edu.tw/2/26/2008. 1 Page.

\* cited by examiner

USING SOURCE-CHANNEL MODELS FOR WORD SEGMENTATION

BACKGROUND OF THE INVENTION

The present invention relates to segmenting text. In particular, the present invention relates to segmenting text that is not delimited by spaces.

In many languages, such as Chinese and Japanese, it is difficult to segment characters into words because the words are not delimited by spaces. Methods used in the past to perform such segmentation can roughly be classified into dictionary-based methods or statistical-based methods.

In dictionary-based methods, substrings of characters in the input text are compared to entries in a dictionary. If a substring is found in the dictionary, it is kept as a possible segmentation of the text. Note that in order to achieve the proper segmentation, every word in the text string must be found in the dictionary. Unfortunately, because of the introduction of new words into the language, especially named entities, it is impossible to always have a complete dictionary.

In statistical-based systems, a scoring mechanism is used to segment the text. Under such systems, models are trained based on a corpus of segmented text. These models describe the likelihood of various segments appearing in a text string. The models are applied to possible segmentations of an input text string to produce scores for each segmentation. The segmentation that provides the highest score is generally selected as the segmentation of the text.

Although such systems overcome the requirement of having every word in the input text in a dictionary, they also have limitations. In particular, such systems are not able to identify an entity type, such as name, location, or date, for a word if the word is not in the dictionary. As a result, after the segmentation, additional processing must be done to categorize unknown words into entity types so that further lexical processing can be performed.

One system attempted to solve this problem by using finite state transducers. A separate finite state transducer was provided for each entity type. During segmentation, the text would be applied to the finite state transducers. If a sub-string of characters satisfied a path of states through a finite state transducer, the sub-string would be identified as a possible segment and it would be tagged with the type associated with the finite state transducer.

Although such systems are able to segment and identify word types at the same time, they are limited in a number of ways. In particular, finite state transducers are not able to accommodate many of the morphological changes that occur in Chinese text. As a result, the finite state transducers cannot handle every type of word found in Chinese text. This means that further processing to categorize unknown words is still required with the finite state transducers. Thus, a new method of segmenting non-segmented text is needed that can segment the text and identify word types in a single unified system while accommodating all of the different word types that can be found in unsegmented languages.

SUMMARY OF THE INVENTION

A method and apparatus for segmenting text is provided that identifies a sequence of entity types from a sequence of characters and thereby identifies a segmentation for the sequence of characters. Under the invention, the sequence of entity types is identified using probabilistic models that describe the likelihood of a sequence of entities and the likelihood of sequences of characters given particular entities. Under one aspect of the invention, organization name entities are identified from a first sequence of identified entities to form a final sequence of identified entities.

DETAILED DESCRIPTION OF ILLUSTRATIVE EMBODIMENTS

Figure 1:
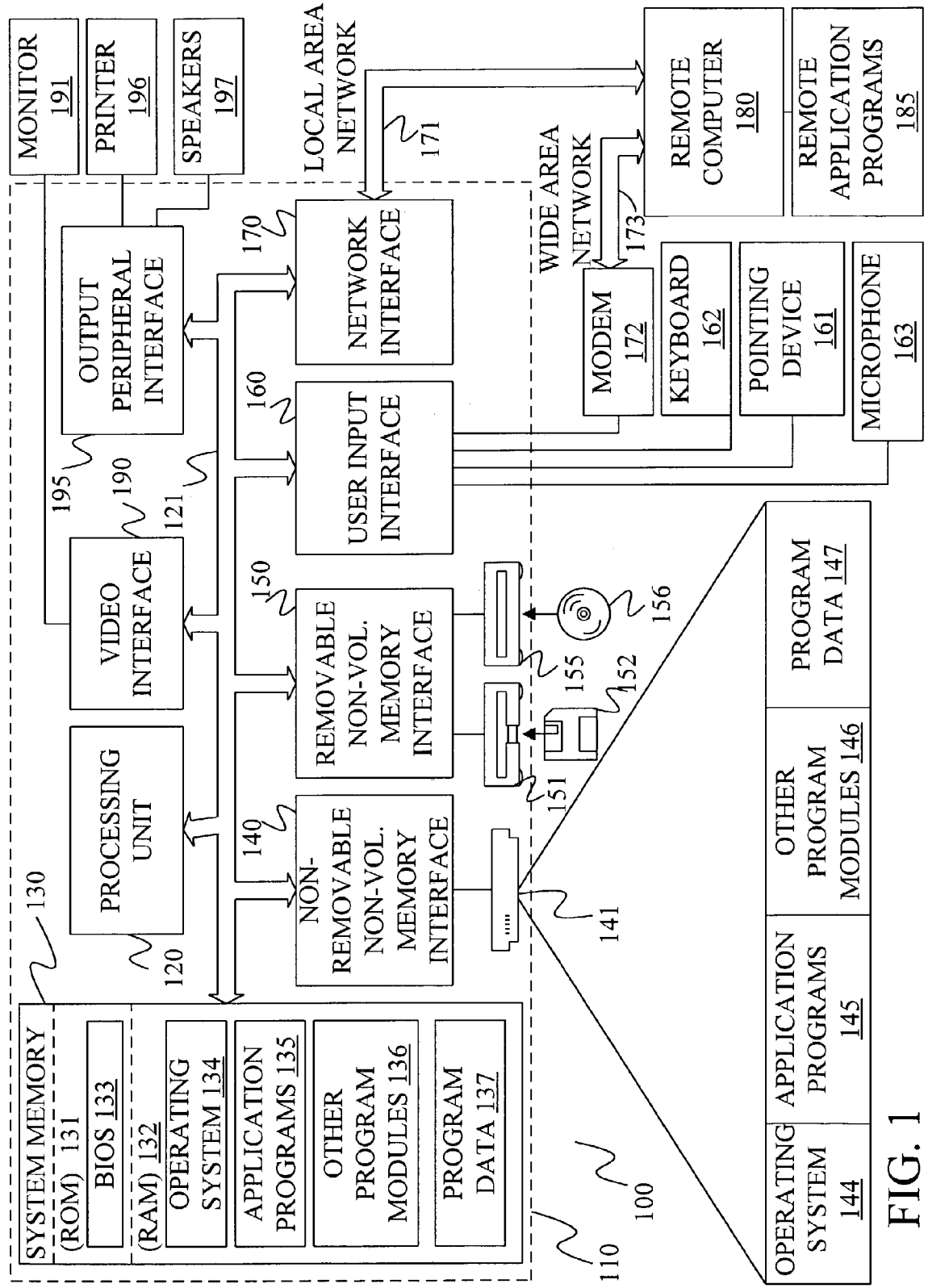
FIG. 1 is a block diagram of an exemplary general purpose computer system suitable for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
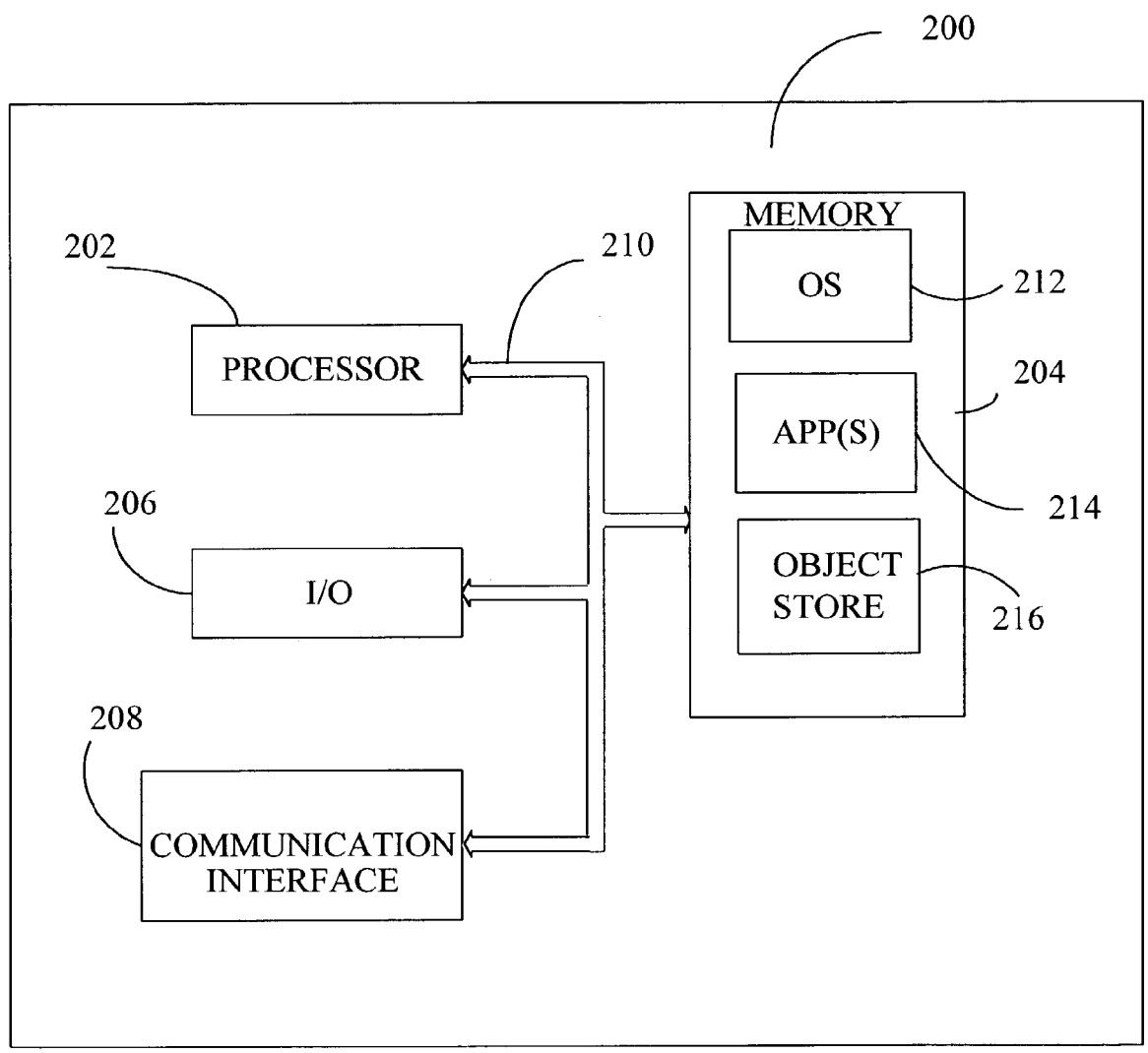
FIG. 2 is a block diagram of a hand-held device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Embodiments of the present invention provide a method and apparatus for segmenting text using a unified scheme that segments the text and at the same time identifies an entity type for each segment.

This unified approach is achieved by converting the segment recognition into an entity recognition that implicitly includes a segment recognition. In pure segment recognition, a most likely word segment W* for a string of characters S is determined as:

$$W^* = \arg\max_W P(W|S) \qquad \text{EQ. 1}$$

which can be rewritten using Bayes' rule and dropping the constant denominator as:

$$W^* = \arg\max_W P(W)P(S|W) \qquad \text{EQ. 2}$$

Under the present invention, a sequence of word segments W is replaced with a sequence of word classes or entities, C, such that equation 2 is rewritten as:

$$C^* = \arg\max_C P(C)P(S|C) \qquad \text{EQ. 3}$$

In equation 3, the speaker is assumed to be attempting to generate a sequence of word classes (entities) instead of individual words. Equation 3 includes two probabilities. The first probability, P(C), is a context probability that describes the likelihood of a sequence of classes (entities). The second probability, P(S|C), is a word class model probability that describes the likelihood of a sequence of characters given a class(entity).

Under one embodiment, the following classes are defined:

1. Lexicon word (LW)—this class consists of words that are found in the normal lexicon or dictionary.

2. Morphologically derived word (MW)—this class consists of words that are morphologically derived from a word in the lexicon. Words that fall within this class are stored in a morphological lexicon as described further below.

3. Person name (PN)—this class consists of words that form a person's name.

4. Location name (LN)—this class consists of words that form a location name representing a location such as "Shamir river".

5. Organization name (ON)—this class consists of words that represent an organization such as "Air China Corporation".

6. Transliteration names (FN)—this class consists of words that are transliterations of foreign names such as person names, location names and organization names.

7. Factoid classes—these classes include a separate class for different types of factoids such as date, time, percentage, money, number, measure, e-mail, phone number, and WWW. Each of these separate classes has its own word class model.

Although equation 3 suggests that the class model probabilities and the context probability can be combined through simple multiplication, in practice, some weighting is desirable. There are two reasons for this. First, some class models are poorly estimated owing to sub-optimal assumptions that are made for simplicity and the insufficiency of the training corpus. Combining the context model probability with poorly estimated class model probabilities according to equation 3 would give the context model too little weight. Second, the class models of different word classes are constructed in different ways. For example, as discussed further below, the person name class is modeled using bigram models whereas the factoid classes are modeled using a set of finite state transducers. One way to balance the probability quantities is to apply class-specific model weights, CW, to each class model probability. These class-specific model weights are determined empirically to optimize the word segmentation performance on a development set.

Figure 3:
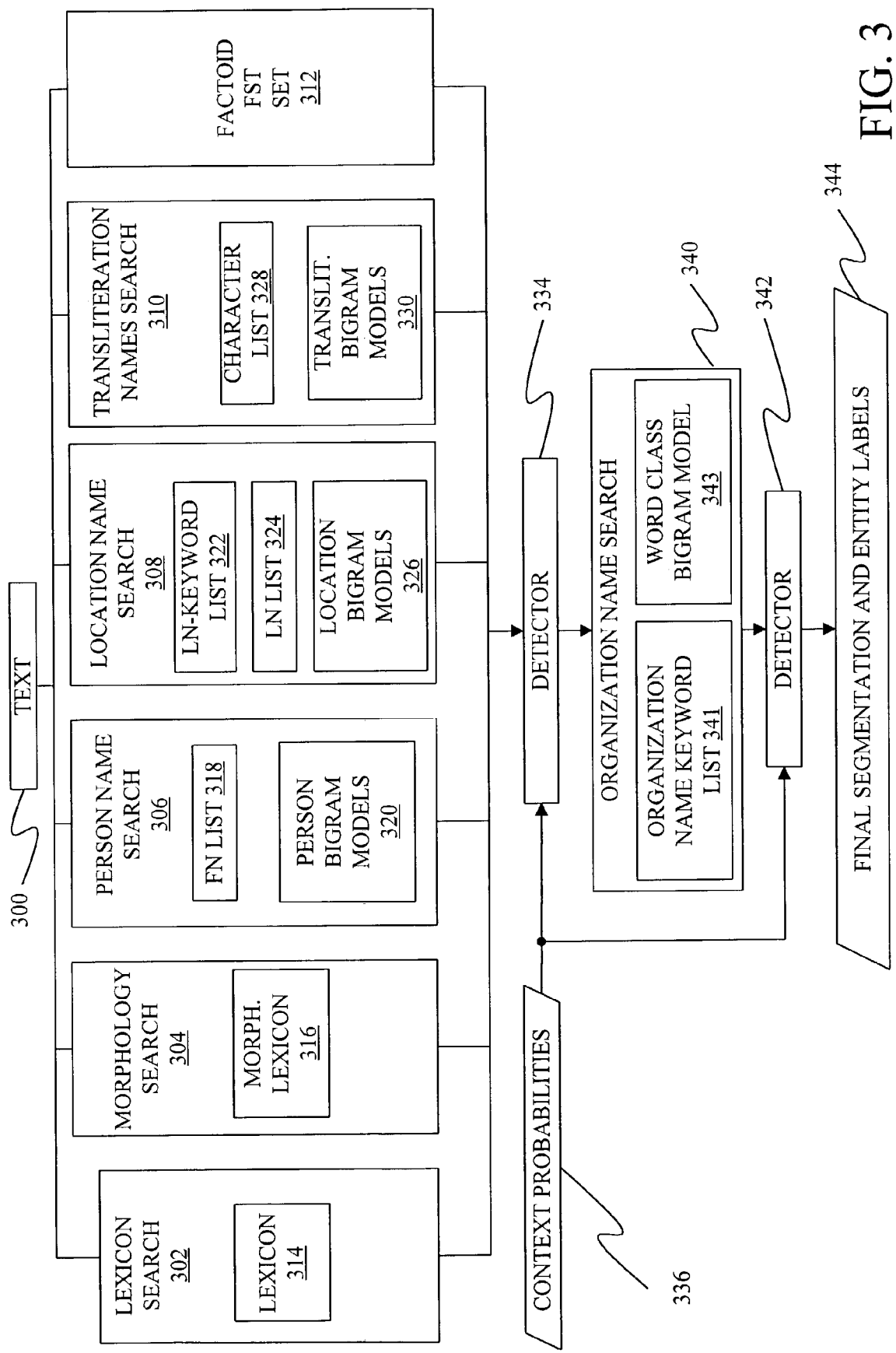
FIG. 3 is a block diagram of elements used in segmenting text under embodiments of the present invention.
Figure 4:
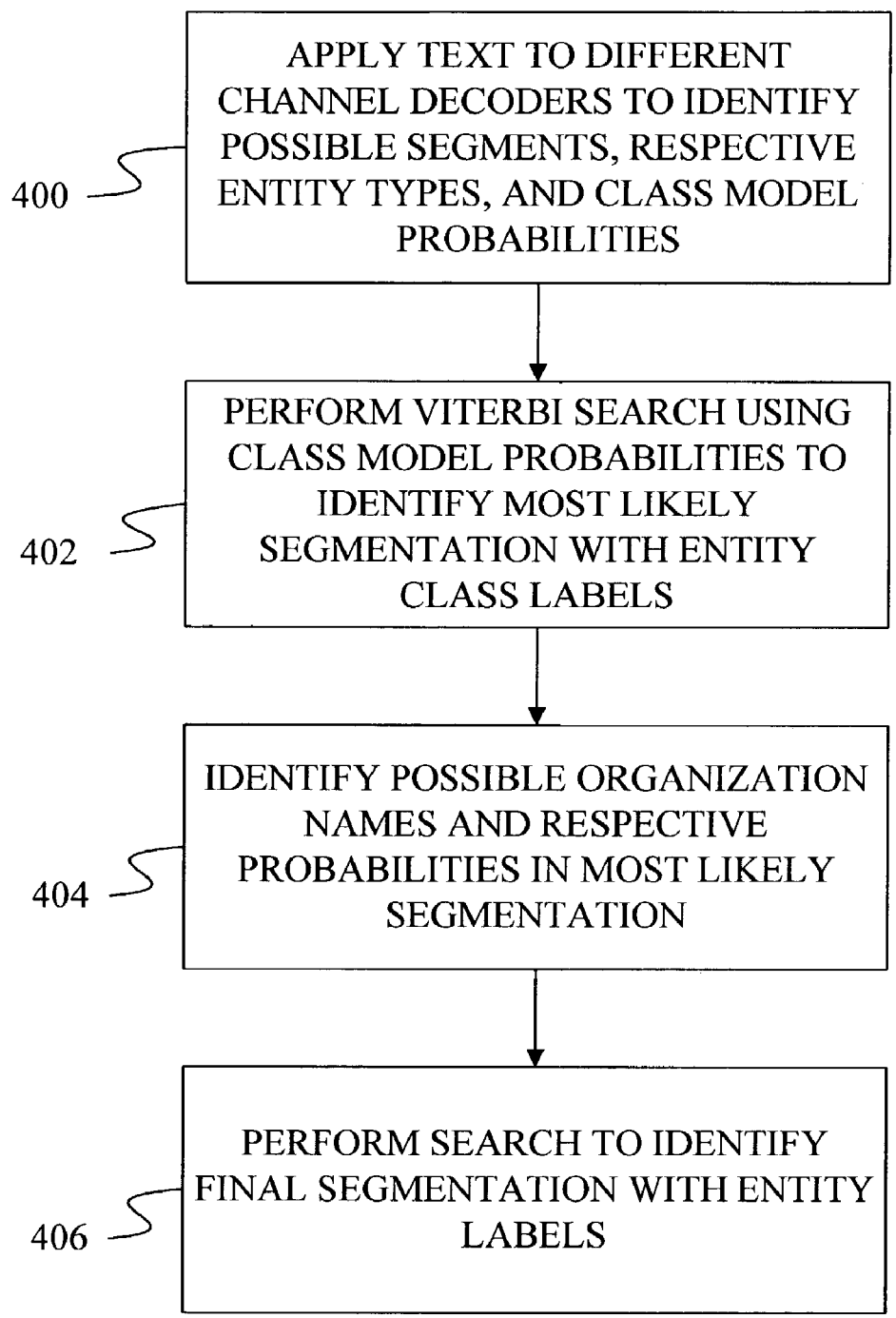
FIG. 4 is a flow diagram of a method of segmenting text under one embodiment of the present invention.

FIG. 3 provides a block diagram and FIG. 4 provides a flow diagram of an apparatus and method that can be used to perform the calculation represented by equation 3. In step 400 of FIG. 4, a text 300 of FIG. 3 is applied in parallel to a plurality of channel decoders to identify possible segments, respective entity types, and class model probabilities. In particular, under one embodiment, the text is applied to a lexicon search 302, a morphology search 304, a person name search 306, a location name search 308, a transliteration name search 310 and factoid FST set 312. Each search unit examines text 300 to identify sub-strings that form class entities. For example, person name search unit 306 identifies sub-strings in text 300 that form person name entities.

Under the present invention, the individual search units are not required to perform complete segmentations. Instead, each search unit identifies all possible sub-strings that can represent an entity associated with the search unit. Thus, the search units are allowed to identify overlapping segments. The proper segmentation is selected later by a detector 334 as discussed further below.

The operation of each of search unit is discussed separately below.

Lexicon Search

Lexicon search unit 302 receives text 300 and segments it into all possible character sub-strings. It then searches a lexicon 314 for each substring. When a sub-string is found in lexicon 314, lexicon search unit 302 marks the sub-string as being a member of the lexicon word class and sets the class model probability P(S|LW) equal to 1. It then outputs the sub-string as a possible segment and tags the segment with the lexicon word class label and the class model probability. Such tagging can be accomplished by placing values in the fields of a data structure for the segment.

Morphology Search Unit

Morphology search unit 304 searches a morphology lexicon 316 for sub-strings of text 300 in a manner similar to the way in which lexicon search unit 302 searches lexicon 314. Morphology lexicon 316 contains examples of morphologically derived words that have been created through morphological patterns such as:

(1) Affixation: where a character is added to a string of other characters to morphologically change the word represented by the original character. For example, adding a character to indicate the plural of a word.

(2) Reduplication: where an original word that consists of characters AB is converted into another word consisting of the characters AABB.

(3) Merging: where one word consisting of characters AB and a second word consisting of characters CB are combined to form a word ACB (4) Head particle (i.e. expressions that are verb plus comp): such as combining a verb character for the word "walk" with two characters representing the word "out" to form a three character word for the phrase "walk out".

(5) Split (i.e. a set of expressions that are separate words at the syntactic level but single words at the semantic level): such as a character string ABC that represents the phrase "already ate", where the bicharacter word AC represents the word "eat" and is split by the particle character B representing the word "already".

To build morphological lexicon 316, embodiments the present invention utilize a system that derives words for the morphological lexicon by applying a set of morphological rules to words in a regular lexicon and words in a large corpus. A set of statistical features are then built based on a large corpus. These features can include things such as how often each of the candidates occurs in the corpus, mutual information, and left/right context dependency. Using these statistical features, the candidate morphologically derived words are filtered to remove candidates that are unlikely based on the corpus. If desired, the candidates that remain after filtering can be manually checked before being placed in the morphological lexicon. Each entry that is placed in the morphological lexicon is tagged by its morphological pattern or rule, which was used to construct the candidate. Thus, if affixation was used to form the morphological candidate, the entry for the morphological candidate would be tagged with the affixation tag.

When morphology search unit 304 finds a sub-string in morphological lexicon 316, it outputs the sub-string as a candidate segment. It also tags the segment with a label representing the morphological pattern or rule used to form the sub-string. In some embodiments, the sub-string is also tagged with a representation of the constituent parts of the sub-string based on the morphological rule. For example, for a word ABC that is derived through the affixation of C to AB, the sub-string would be tagged with [AB+C] to indicate that AB is the lemma and C is the suffix that has been affixed to the lemma. The sub-string is also tagged with a class model probability, $P(S|MW)$, which is set equal to one.

Person Name Search

Person name search unit 306 identifies sub-strings in text 300 that may represent a person's name, either the person's family name or the person's family name and given name. To do this, person name search unit 306 searches a list of names 318 to determine if any of the sub-strings are in the list. Under one embodiment, the list of names contains only family names. One specific embodiment included 373 entries in the family name list.

If a sub-string is found in the family name list, a set of possible sub-strings is generated in order to capture all of the characters associated with the person's name. For example, in Chinese, a family name will be formed of one or two characters and may be followed by a given name of one or two characters. Thus, in order to cover all possible formations of a persons name, sub-strings of the matching family name, the matching family name plus a following character, and the matching family name plus two following characters will be formed by person name search unit 306.

For each sub-string, person name search unit 306 generates a class model probability for the person name (PN) entity, $P(S|PN)$. For the sub-string that consists just of the family name, the class model probability is equal to the probability $P(S_F|F)$ where $S_F$ is the sub-string that was found in the list of family names and F represents the class of all Family names. This probability is trained as the ratio of the number of times that the character string was found as a family name in a corpus over the number of times that any family name was found in the corpus. For a sub-string pattern consisting of a family name followed by a one character given name, the class model probability $P(S|PN)$ is calculated as: $P(S_F|F) \cdot P(S_{G1}|G1)$, where $S_{G1}$ is the single character for the given name, G1 is the class of all characters found as a first character of a given name and the probability $P(S_{G1}|G_1)$ is calculated from a training corpus by taking the ratio of the number of times that character $S_{G1}$ is found as a given name over the number of times that a first character of a given name is found in a training corpus. For a sub-string pattern consisting of the family name followed by a two character given name, the class model probability is determined as:

$$P(S_{PN}|PN)=P(S_i|F)P(S_{G1}|G1)P(S_{G2}|S_{G1}G2) \qquad \text{EQ. 4}$$

where $S_{G2}$ is the second character of the given name, G2 is the class of characters found as second characters in a given name, and the probability $P(S_{G2}|S_{G1}G_2)$ is the ratio of the number of times that character S2 is found in a given name in a training corpus when character $S_{G1}$ has been found as the first character in the given name over the number of times that any character has been found as the second character when $S_{G1}$ was found as the first character in the given name. The probabilities described above are stored in a person bigram model 320 that is accessed by person name search unit 306.

The output of person name search unit 306 is a set of segments tagged as person name entities, which in some embodiments are further tagged by indicating which characters are associated with a family name and which characters are associated with a given name. The segments are also tagged with the class model probability for the sub-string.

Location Name Search

Location name unit 308 identifies sub-strings in text 300 that may represent location names. To do this, location name unit 308 searches a list of location names 324 and a list of location name keywords 322 for the sub-strings in text 300. Location names list 324 contains complete location names while location name keywords list 322 includes single keywords such as the character for "city". Under one embodiment, location name list 324 contains 30,000 location names and the location name keyword list 322 contains 120 location name keywords.

If a location keyword is located in a sub-string, a set of segments is identified, each of a different length but each ending in the location keyword. Under one embodiment, the largest segment is 10 characters long.

For each sub-string, S', that is either in location name list 324 or ends in a location name keyword that is in location keyword list 322, a class model probability P(S'|LN) is computed using a character bigram model 326. For example, for a string of characters ABCD in which character D is a location name keyword character, the class model probability of the substring would be estimated as:

$$P(ABCD|LN)=P(A|<LN>)P(B|A)P(C|B)P(D|C)P(</LN>|D) \quad \text{EQ. 5}$$

where <LN> represents the beginning of the location name and </LN> represents the end of a location name. Each bigram probability in equation 5 is trained by determining the number of times the bigram appears in the location list 324 over the number of total bigrams in the location list.

The output of location name search 308 is a list of possible location name sub-strings together with their word class probability.

Transliteration Name Search

Transliteration name search unit 310 searches for sub-strings in text 300 that represent the transliteration of a foreign name such as the name of a person, location or organization. This involves looking for sub-strings that consist only of characters found in a list of characters 328 that are used in transliterations. Under one embodiment for the Chinese language, this list includes 618 Chinese characters.

If a sub-string S' is found to be a possible transliteration entity (FN), the class model probability, P(S'|FN), is determined. Under one embodiment, the class model probability is determined using character bigram models 330. For example, the class model probability for a sub-string ABC would be calculated as:

$$P(ABC|FN)=P(A|<FN>)P(B|A)P(C|B)P(</FN>|C) \quad \text{EQ. 6}$$

where A,B,C are characters that form sub-string S', <FN> indicates the beginning of a transliteration named entity and </FN> indicates the end of the transliteration.

Because a transliteration can represent any named entity, including a person name, location name, or an organization name, embodiments of the present invention generate three separate segments for each transliteration sub-string with each segment being marked as a different entity. Thus, one segment will be marked as a person name entity, one segment will be marked as a location name entity, and one segment will be marked as an organization name entity. Although each segment is marked as a different entity, each will have the same class model probability, which is determined using the transliteration bigram, and each will have the same sub-string.

Factoid

Factoid FST set 312 identifies sub-strings that may represent factoids such as date, time, percentage, number, money, measure, e-mail, phone number and WWW address. To identify such factoids, factoid FST set 312 provides a separate set of finite state transducers for each factoid type. Each sub-string of characters in text 300 is applied to each finite state transducer. If a finite state transducer ends in a success state after traversing a sub-string S', the sub-string is marked as a factoid and the class model probability P(S'|FT) for the sub-string S' given that it is a factoid is set equal to 1. In some embodiments, the factoid is also marked with the particular type of factoid associated with the finite state transducer. For example, a sub-string that represents a date would be marked as a DATE factoid.

Decoding

Each of the segments produced by the search units are provided to a detector 334, along with the respective entity labels and class model probabilities. Detector 334 also accesses context probabilities 336, which contains the probabilities of sequences of classes (entities) P(C).

At step 402 of FIG. 4, detector 334 selects the most likely sequence of classes (entities) using the class model probabilities and the context probability in Equation 3 above. In one embodiment, this selection is performed using a Viterbi search.

The most likely sequence of classes (entities) is associated with a sequence of segments. Thus, by selecting a most likely sequence of classes (entities), step 402 inherently identifies a tagged segmentation for the text that indicates the class (entity) of each segment. Thus, segmentation and entity identification are unified in a single probabilistic decoding step under the present invention.

Organization Name Search

The most likely segmentation is provided to an organization name search unit 340. In the past, organization names have been difficult to identify because they are based on other named entities. For example, an organization name can be constructed from a person name or a location name. Under the present invention, organization names can be identified from such named entities using the most likely segmentation and its associated class entities.

At step 404, organization name search unit 340 searches an organization keyword list 341 for words found in the most likely segmentation. Under one embodiment, this keyword list includes 1,355 entries such as the character sequence for "corporation".

The length of the organization name is not known. To deal with this, organization name search unit 340 forms a separate sub-string for each character combination up to 15 characters before the keyword in the string. Each of these sub-strings is identified as a possible organization name.

A class model probability is determined for each sub-string that is identified by organization name search unit 340. Under one embodiment, the class model probability, P(S'|ON), is a word class bigram model. For example, the class word probability for the organization name is calculated as:

$$P(XY|ON)=P(C(X)|<ON>)P(C(Y)|C(X))P(C(Y)|</ON>)P(X|C(X))P(X|C(X))P(Y|C(Y)) \quad \text{EQ. 7}$$

where XY are two word strings, C(X) is the class entity of word string X, C(Y) is the class entity of word string Y, <ON> indicates the beginning of an organization name, </ON> indicates the end of an organization name, and P(X|C(X)) and P(Y|C(Y)) are the class model probabilities associated with word strings X and Y, which are calculated according to the entity type as discussed above. Note that word strings X and Y can be one or more characters and one or more words.

The organization sub-strings and the class model probabilities of those sub-strings are provided with the original segmentation and the class model probabilities associated with the original segmentation to detector 342. Detector 342 uses the class model probabilities and context probabilities 336 in Equation 3 to select a new most likely sequence of class entities. The sequence of class entities that provides the maximum probability is selected as the final segmentation 344 at step 406. Note that if an organization name is found in the final segmentation, the final segmentation will consist of a nested segmentation in which the organization name is found in an upper level of the segmentation and the individual segments that form the organization name are found in a lower level of the segmentation.

Training

To train the character bigram models used in the person name, location name, and transliteration name class models, the word bigram models used in the organization name class model and the context model probability P(C), an annotated corpus is needed that indicates class assignments for substrings in a string of characters. Unfortunately, building such annotated training corpora is very expensive.

Under one embodiment of the present invention, a bootstrapping approach is used to build such a corpus. Under this approach, a corpus is initially annotated using a greedy word algorithm, which is one based on a forward maximum matching algorithm. Based on this initial annotation, initial probabilities for the context and class models are formed. These models are then used to reannotate the corpus by applying the strings of the corpus to the system of FIG. 3. Using the new annotation, the context model and the class model probabilities are retrained. The retrained models are then used to reannotate the corpus. The reannotation and retraining is iterated until the performance of the system converges.

Under one embodiment, the performance of the bootstrapping annotation is improved by improving the initial annotation. In particular, the segmentation ability of the greedy word algorithm is improved by resolving segmentation ambiguities known as overlap ambiguity and combination ambiguity. If a character string ABC can be segmented into two words either as AB, C or A, BC depending on the context of the string, ABC is called an overlap ambiguity string. If a character string AB can be segmented either into two words A, B or as one word AB, depending on the context, AB is called a combination ambiguity string. To resolve overlap ambiguity, all of the overlap ambiguity strings in the training data are replaced with a single token. To resolve combination ambiguity, high-frequency two-character combination ambiguity strings are selected. For each combination ambiguity string, a binary classifier is trained using manually segmented sentences that contain the combination ambiguity string. For each occurrence of a combination ambiguity string in the initial segmented training date, the corresponding classifier is used to determine whether or not the combination ambiguity string should be segmented.

To further improve the initial annotation, the initial greedy word segmentor is augmented with the factoid finite state machines of factoid FST set 312. Additionally, a small subset of the training data can be manually annotated to indicate the location of named entities thereby forming a seed set. The context model probability can then be interpolated from this seed set.

Although the present invention has been described with reference to particular embodiments, workers skilled in the art will recognize that changes may be made in form and detail without departing from the spirit and scope of the invention.

What is claimed is:

1. A method of segmenting text formed of a sequence of characters, the method comprising:

determining a class model probability of an entity given a candidate segment of the sequence of characters;

determining a context probability of a sequence of entities; and combining the class model probability and the context model probability to select a sequence of entities and thereby select a sequence of candidate segments as a segmentation of the text.

2. The method of claim 1 wherein determining a class model probability of an entity comprises determining that the candidate segment is a possible lexicon entity and determining a class model probability of the lexicon entity.

3. The method of claim 2 wherein determining that the candidate segment is a possible lexicon entity comprises finding the candidate segment in a lexicon.

4. The method of claim 3 wherein determining the class model probability comprises setting the class model probability equal to one.

5. The method of claim 1 wherein determining a class model probability of an entity comprises determining that the candidate segment is a possible morphological lexicon entity and determining a class model probability of the morphological lexicon entity.

6. The method of claim 5 wherein determining that the candidate segment is a possible morphological lexicon entity comprises finding the candidate segment in a morphological lexicon.

7. The method of claim 6 wherein determining the class model probability comprises setting the class model probability equal to one.

8. The method of claim 6 further comprising retrieving a morphological pattern from the morphological lexicon based on the candidate segment and tagging the candidate segment with the morphological pattern.

9. The method of claim 1 wherein determining a class model probability of an entity comprises determining that the candidate segment is a possible name entity and determining a class model probability of the name entity.

10. The method of claim 9 wherein determining that the candidate segment is a possible name entity comprises determining that the candidate segment is a possible person name entity.

11. The method of claim 10 wherein determining that the candidate segment is a possible person name entity comprises matching at least one name in a list of names to at least one character in the candidate segment.

12. The method of claim 11 wherein the list of names comprises a list of family names.

13. The method of claim 9 wherein determining that the candidate segment is a possible name entity comprises determining that the candidate segment is a possible location name entity.

14. The method of claim 13 wherein determining that the candidate segment is a possible location name entity comprises matching a location name in a list of location names to the entire candidate segment.

15. The method of claim 13 wherein determining that the candidate segment is a possible location name entity comprises matching a location keyword in a list of location keywords to at least one character in the candidate segment.

16. The method of claim 9 wherein determining the candidate segment is a possible name entity comprises determining that the candidate segment is a possible transliteration name entity.

17. The method of claim 16 wherein determining that the candidate segment is a possible transliteration name entity comprises matching each character in the candidate segment to a respective character in a list of characters associated with transliteration.

18. The method of claim 9 wherein determining a class model probability of the name entity comprises forming the class model probability from a set of character bigram probabilities.

19. The method of claim 1 wherein determining a class model probability of an entity comprises determining that the candidate segment is a possible factoid entity and determining a class model probability of the factoid entity.

20. The method of claim 19 wherein determining that the candidate segment is a possible factoid entity comprises applying the candidate segment to a finite state transducer.

21. The method of claim 19 wherein determining a class model probability of the factoid entity comprises setting the class model probability equal to one.

22. The method of claim 1 wherein selecting a sequence of entities comprises selecting one sequence from a plurality of possible sequences of entities.

23. The method of claim 22 further comprising determining a class model probability for each entity in the plurality of possible sequences of entities.

24. The method of claim 1 further comprising identifying possible organization names in the selected sequence of entities.

25. The method of claim 24 wherein identifying a possible organization name comprises finding a word that is in the selected sequence of candidate segments in an organization name keyword list.

26. The method of claim 25 wherein identifying possible organization names further comprises identifying each of a plurality of sequences of candidate segments that end in a candidate segment that is found in the organization name keyword list as possible organization names.

27. The method of claim 24 further comprising determining a class model probability for each possible organization name.

28. The method of claim 27 further comprising using the class model probabilities for the possible organization names to select a second sequence of entities.

29. The method of claim 28 wherein using the class model probabilities for each possible organization name to select a sequence of entities comprises using the class model probabilities for each possible organization name and the class model probabilities of the entities in the selected sequence of entities to select the second sequence of entities.

30. A computer-readable storage medium having encoded thereon computer-executable instructions for performing steps comprising:
  determining a class model probability for a segment of a text given a first entity;
  determining a class model probability for a segment of the text given a second entity; and
  using the class model probabilities for the first entity and the second entity to select a sequence of entities that is represented by the text and thereby segment the text.

31. The computer-readable storage medium of claim 30 wherein the first entity and the second entity are different from each other.

32. The computer-readable storage medium of claim 30 wherein the class model probability for the first entity is determined in a different manner from the class model probability for the second entity.

33. The computer-readable storage medium of claim 30 wherein the first entity is a lexicon word entity and determining a class model probability for the lexicon word entity comprises finding the segment of text in a lexicon and setting the class model probability for the lexicon word entity equal to one.

34. The computer-readable storage medium of claim 30 wherein the first entity is a morphological lexicon word entity and determining a class model probability for the morphological lexicon word entity comprises finding the segment of text in a morphological lexicon and setting the class model probability for the morphological lexicon word entity equal to one.

35. The computer-readable storage medium of claim 30 wherein the first entity is a name entity.

36. The computer-readable storage medium of claim 35 wherein the name entity is a person name entity and determining a class model probability for the person name entity comprises finding a portion of the segment of text in a list of names and setting the class model probability for the person name entity using character bigram probabilities.

37. The computer-readable storage medium of claim 35 wherein the name entity is a location name entity and determining a class model probability for the location name entity comprises finding at least a portion of the segment of text in a list of location names and setting the class model probability for the location name entity using character bigram probabilities.

38. The computer-readable storage medium of claim 35 wherein the name entity is a transliteration name entity and determining a class model probability for the transliteration name entity comprises finding each character in the segment of text in a list of characters and setting the class model probability for the transliteration name entity using character bigram probabilities.

39. The computer-readable storage medium of claim 38 further comprising determining class model probabilities for a person name entity, a location name entity and an organization name entity for the same segment associated with the transliteration name entity by setting the class model probabilities equal to the class model probability of the transliteration name entity.

40. The computer-readable storage medium of claim 30 wherein the first entity is a factoid entity and determining a class model probability for the factoid entity comprises applying the segment of text to a finite state transducer, having the finite state transducer end in a success state and setting the class model probability for the factoid equal to one.

41. The computer-readable storage medium of claim 40 wherein separate finite state transducers are provided for separate types of factoid entities.

42. The computer-readable storage medium of claim 41 further comprising tagging the segment with the type of factoid entity associated with the finite state transducer.

43. The computer-readable storage medium of claim 30 further comprising identifying an organization name entity from the sequence of entities.

44. The computer-readable storage medium of claim 43 wherein identifying an organization name comprises finding a segment in a list of organization name keywords.

45. The computer-readable storage medium of claim 43 further comprising determining a class model probability for the organization name entity.

46. A method of identifying organization names in an unsegmented text, the method comprising:
  identifying a sequence of entities in the unsegmented text to thereby segment the text;

identifying a possible organization name from a portion of the segmented text;

determining a probability for the possible organization name based on at least a portion of the sequence of entities; and using the probability to determine whether to accept the possible organization name as an organization name.

47. The method of claim 46 wherein the sequence of entities comprises at least one name entity.

48. The method of claim 46 wherein identifying a possible organization name comprises finding a segment of the segmented text in a list of organization name keywords.

49. The method of claim 46 wherein determining a probability for the possible organization name comprises utilizing class entity bigram probabilities.

50. The method of claim 49 wherein one of the class entity bigram probabilities provides the probability of a name entity given a lexicon word entity.

51. The method of claim 49 wherein determining a probability for the possible organization name further comprises utilizing class model probabilities for each entity incorporated in the organization name, wherein each class model probability provides the probability of an entity given a sequence of characters associated with the entity.

* * * * *